Feb. 18, 1958     B. D. MORGAN     2,823,728
METHOD AND APPARATUS FOR MAKING AN ADHESIVE BANDAGE
Filed Feb. 16, 1956     2 Sheets-Sheet 1
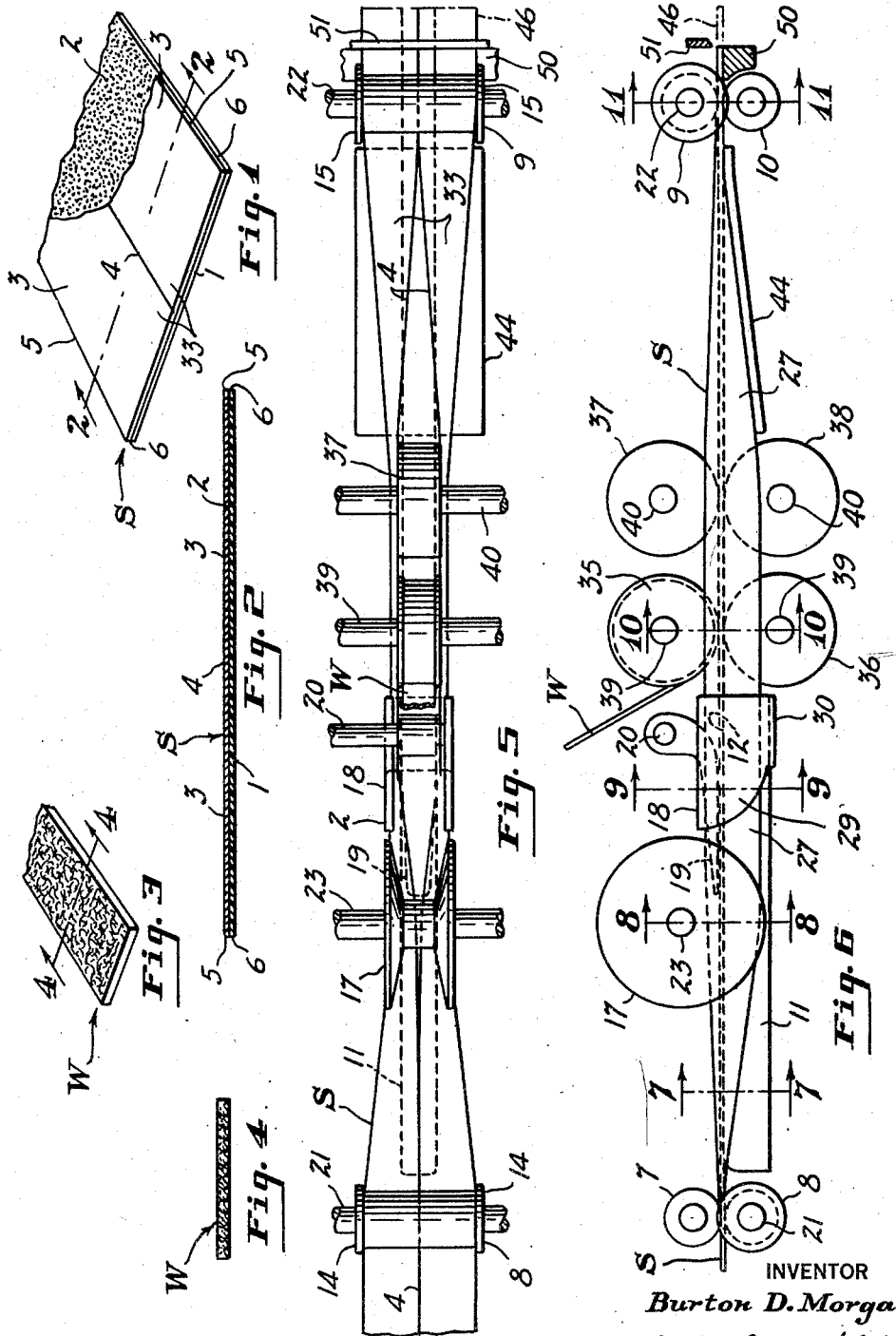
INVENTOR
*Burton D. Morgan*
BY *McCoy, Greene r/e Grotenhuis*
ATTORNEYS Feb. 18, 1958  B. D. MORGAN  2,823,728
METHOD AND APPARATUS FOR MAKING AN ADHESIVE BANDAGE
Filed Feb. 16, 1956  2 Sheets-Sheet 2
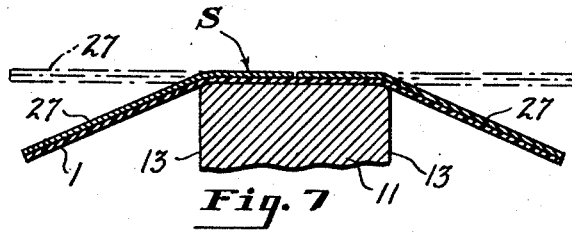
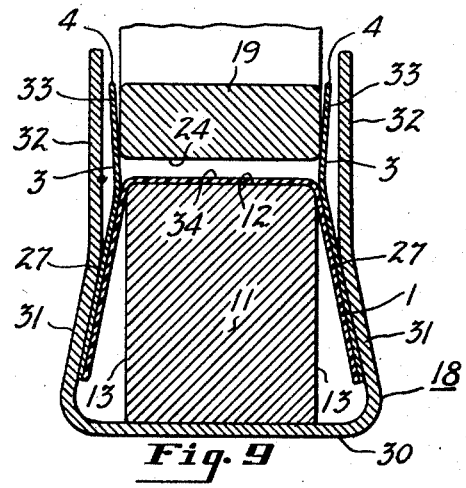
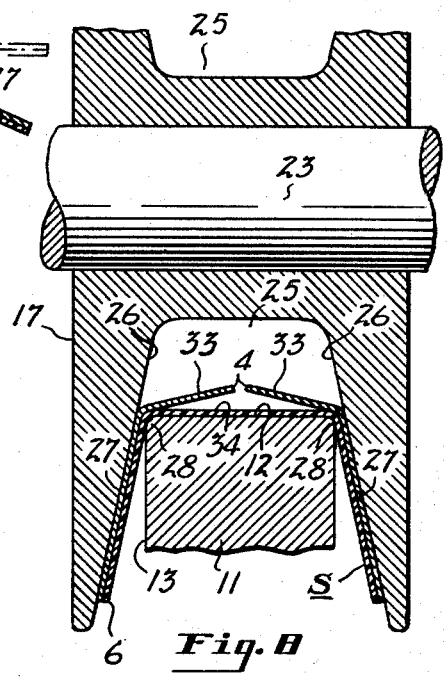
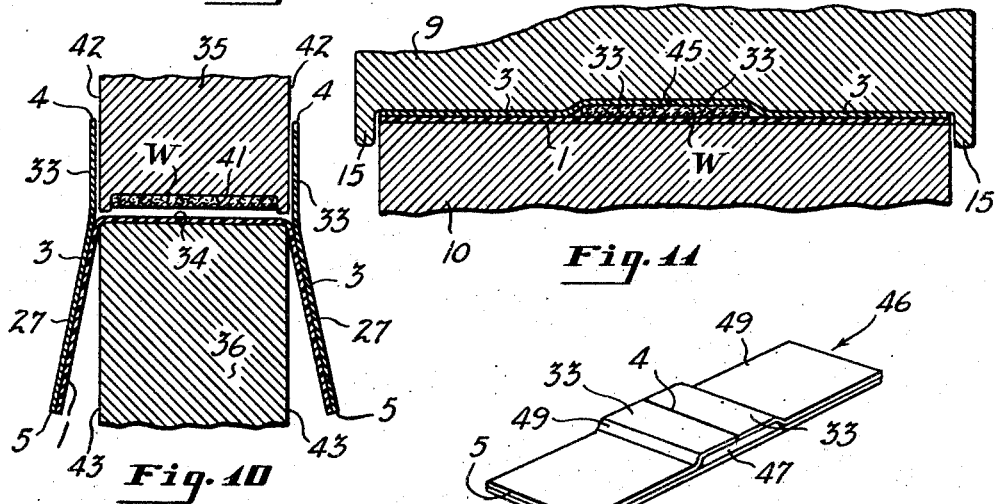
INVENTOR
Burton D. Morgan
ATTORNEYS United States Patent Office 2,823,728
Patented Feb. 18, 1958

2,823,728

METHOD AND APPARATUS FOR MAKING AN ADHESIVE BANDAGE

Burton D. Morgan, Painesville, Ohio

Application February 16, 1956, Serial No. 565,861

6 Claims. (Cl. 154—1.6)

The present invention relates to an adhesive bandage and a method of and apparatus for making said bandage.

According to the present invention, a multiplicity of simple, inexpensive, adhesive bandages are mass produced in a continuous operation from a continuous strip comprising a continuous, plastic, backing sheet having a pressure-sensitive, adhesive surface and a pair of continuous, facing sheets of paper or other suitable material adhered to and covering the adhesive surface. The strip is moved longitudinally by feed rollers or the like and the inner side portions of the facing sheets are separated from the backing sheet to uncover the central portion of the adhesive surface of the moving strip, side portions of the moving strip preferably being bent relative to the central portion of the strip to facilitate separation of said inner side portions. A strip of gauze or other suitable absorbent dressing material is then applied to the exposed central adhesive surface of the backing sheet, and the inner side portions of the facing sheet are moved back over the backing sheet to cover the dressing material. The strip is then cut transversely into a multiplicity of adhesive bandages.

An object of the present invention is to provide a simple, effective, adhesive bandage which may be mass produced at a minimum cost.

A further object of the invention is to provide a simple and efficient method of and apparatus for making adhesive bandages from thin strips of pliable plastic material.

Other objects, uses and advantages of the present invention will become apparent to those skilled in the art from the following description and claims and from the drawings, in which:

Figure 1 is a fragmentary perspective view with parts broken away showing the flexible strip used in making the adhesive bandages of the present invention;

Figure 2 is a transverse vertical cross-sectional view on an enlarged scale taken on the line 2—2 of Fig. 1;

Figure 3 is a fragmentary perspective view similar to Fig. 1 showing the strip of gauze used in making the adhesive bandages;

Figure 4 is a transverse vertical cross-sectional view similar to Fig. 2 and on the same scale taken on the line 4—4 of Fig. 3;

Figure 5 is a fragmentary top plan view on a reduced scale with parts omitted showing the machine for making the adhesive bandages;

Figure 6 is a fragmentary side elevational view of the machine shown in Fig. 5 and on the same scale;

Figure 7 is a fragmentary transverse vertical sectional view taken on the line 7—7 of Fig. 6 and on a larger scale, the position of the side portions of the strip prior to bending thereof being shown in dot-dash lines;

Figure 8 is a fragmentary transverse vertical sectional view taken on the line 8—8 of Fig. 6 and on the same scale as Figs. 2, 4 and 7;

Figure 9 is a fragmentary transverse vertical sectional view taken on the line 9—9 of Fig. 6 and on the same scale as Fig. 8;

Figure 10 is a fragmentary transverse vertical sectional view taken on the line 10—10 of Fig. 6 and on the same scale as Fig. 9;

Figure 11 is a fragementary transverse vertical sectional view taken on the line 11—11 of Fig. 6 and on the same scale as Fig. 10; and Figure 12 is a perspective view of one of the adhesive bandages made in the machine of Figs. 5 to 11.

Referring more particularly to the drawings which are drawn substantially to scale and in which like parts are referred to by the same numerals throughout the several views, Figs. 1 and 2 show an end portion of a long, continuous, flexible, laminated strip S of uniform width and thickness comprising a thin, flexible, continuous, imperforate, backing sheet 1 of uniform width and thickness extending the full length of the strip S and having one face completely covered by a uniformly thin layer 2 of a suitable pressure-sensitive adhesive and a pair of flexible, inextensible, facing tapes or sheets 3 of the same size that extend the full length of the sheet 1 and completely cover the adhesive surface of the layer 2. Each of the facing sheets 3 is of uniform thickness and has a uniform width that is half the width of the backing sheet 1, the facing sheets having straight inner side edges 4 in abutting relation midway between the straight parallel side edges 6 of the backing sheet and having straight outer side edges 5 flush with said side edges 6. The facing sheets 3 are adhered to the backing sheet 1 by the adhesive layer 2 and reinforce the backing sheet so that it may easily be handled by feed rollers or the like even where the backing sheet is made of a somewhat extensible thermoplastic material.

The backing sheet 1 may be made of various elastic, extensible or inextensible materials but is preferably made of flexible thermoplastic materials having linear molecular structure such as polyvinyl chloride, copolymers of vinyl chloride and vinyl acetate and/or vinylidene chloride, polyvinylidene cyanide, copolymers of vinyl chloride and fluorochloroethylenes, or the like.

"Mylar" film (polyethylene terephthalate) and other flexible plastic materials may also be used for the backing sheet, but slightly stretchable materials such as a plasticized polyvinyl chloride in which the plasticizer is predominantly or largely of polymeric character (for example, in which the plasticizer is a polyester and/or a nitrile rubber) is preferred so that most of the plasticizer is non-migratory.

The facing sheets 3 may be made of crinoline or various other inextensible materials but are preferably cut from rolls of strong heavy paper, for example of the type used in the manufacture of widely used gummed paper tapes or "strapping" tapes. Such paper preferably has a smooth hard imperforate surface so that it may readily be separated from the adhesive layer 2. It may be a resin-impregnated paper or one prepared by incorporating a resin, such as a phenolic resin, rosin, or urea resin, in the beater with the pulp so as to have a dense surface. The paper is preferably one treated with a parting compound such as a liquid, organic, silicone, releasing agent or other parting compound known to the art so that adhesion is less to the paper than to the backing sheet 1.

Various pressure-sensitive adhesives may be used to cover the backing sheet 1, such as disclosed in Dahlquist Patent No. 2,532,011 and Kellgren Patent No. 2,496,349. Such adhesive should be separable from the facing sheets but should be capable of adhering said facing sheets to the backing sheet as the strip S moves through the bandage-making machine. The adhesive should also be capable of adhering strongly to the backing sheet so that it will not be pulled from the backing sheet when the facing sheets are removed. When thermoplastic materials are used to form the backing sheet, the pressure-sensitive adhesive layer 2 may be formed from various adhesive materials, such as disclosed in Oace Patent No. Re. 23,843 or Pike Patent No. 2,576,968.

Figures 3 and 4 show an end portion of a long continuous strip of gauze W used to make the sterile dressings for the bandages of the present invention. The strip W has a uniform thickness throughout its length and a uniform width slightly less than one-third the width of the strip S.

Figures 5 to 11 show a machine for performing the method of the present invention including upper and lower horizontal cylindrical feed rolls 7 and 8 at one end of the machine and upper and lower horizontal cylindrical feed rolls 9 and 10 similar to the rolls 8 and 7, respectively, at the opposite downstream end of the machine. The feed rolls 7, 8 and the feed rolls 9, and 10 are driven at a constant peripheral speed and grip the strip S and hold it so that its central portion is in a horizontal position between said feed rolls as it moves through the machine. A straight metal bar 11 of uniform rectangular cross section having a smooth flat horizontal upper surface 12 and smooth flat side faces 13 is provided to serve as a bed for holding the central portion of the strip S in a horizontal position and for guiding said strip as it passes from the feed rolls 7 and 8, the side faces 13 being parallel to and spaced the same distance from the vertical plane through the middle of the strip S. The annular guide flanges 14 and 15 of the feed rolls 8 and 9, respectively, are also parallel to and spaced the same distance from said vertical plane so as to guide the strip S parallel to the bar 11.

The feed rolls 7 and 10 have an axial width corresponding to the width of the strip S and are externally cylindrical throughout their width so that the strip is flat as it passes over the rolls as shown in dot-dash lines in Fig. 7 and in solid lines in Fig. 11, the flanges 14 and 15 projecting radially outwardly adjacent the side edges of the strip within the circumference of the rolls 7 and 10 to prevent lateral movement of the strip.

Various means may be provided for turning the side portions of the strip S over the bar 11 and for separating the adjacent side edges 4 as the strip moves over the feed rolls. As herein shown, such means includes a channeled turn-down roller 17, a U-shaped folding member 18, and a pivoted flap-engaging separating finger 19 above the member 18 and projecting below the roller 17. The finger 19 has a rectangular vertical cross section and a uniform horizontal width equal to the width of the bar 11 which is preferably about one-third the width of the strip S as shown in Fig. 9. Said finger is mounted directly above the bar 11 on a horizontal supporting shaft 20 parallel to the shafts 21 and 22 of the feed rolls and the shaft 23 of the roller 17 and has a smooth generally horizontal lower surface 24 of substantial length spaced from the bar 11 by a vertical distance slightly greater than the thickness of the strip S.

The roller 17 is shaped like a pulley for a conventional V-belt and has a uniform radial cross section throughout its circumference substantially as shown in Fig. 8. Said roller has a smooth annular channel 25 which in cross section is in the form of an isosceles trapezoid. The opposite side faces 26 of the channel are frusto-conical and are preferably tapered relative to the vertical at an angle of about 10 to 20 degrees. The channel 25 is symmetrical relative to the medial plane of the guide bar 11 and the separating finger 19 and of a size to receive the strip S when the side portions 27 of the strip are turned down over the bar, each side face 26 being spaced from the adjacent rounded upper side edge 28 of the bar 11 a distance substantially corresponding to the thickness of the strip S.

The folding member 18 is made from a thin sheet of metal of uniform thickness which is bent to form a channel of substantially the same size as the channel 25. The member 18 has a body portion with a uniform U-shaped cross section throughout its length substantially as shown in Fig. 9 and a pair of parallel generally triangular vertical side portions 29 that project toward the roller 17 and terminate adjacent the periphery of said roller. The folding member is symmetrical about the medial plane of the bar 11 and has a flat horizontal central portion 30 which is rigidly mounted on the lower face of the stationary bar 11, inclined lower side wall portions 31, and flat vertical upper side wall portions 32. The lower portions 31 are preferably spaced apart substantially like the side faces 26 of the roller 17, as indicated in Fig. 9 so as to hold the side portions 27 of the strip in substantially the same position as by the roller 17 whereby the side portions 27 are substantially flat as they move past the roller 17 and the folding member 18.

The separating finger 19 gradually decreases in vertical thickness in the upstream direction and extends longitudinally beyond the folding member 18 into the channel 25 of the roller 17 as indicated in Fig. 6. Said channel provides sufficient space between the bar 11 and the roller 17 to permit separation of the inner side portions 33 of the facing sheets 3 from the adhesive layer 2 as the strip S passes through the channel 25. The finger 18 fits between the side portions 33 and moves them to substantially vertical positions as they move longitudinally past the roller 17 and the member 18 so as to expose the central portion 34 of the adhesive layer 2 above the bar 11.

Means is provided for applying the absorbent dressing W to the exposed adhesive portion 34 including a symmetrical, gauze-applying roll 35; an externally cylindrical, lower roll 36 vertically aligned with the roll 35; and a pair of vertically aligned, externally cylindrical, feed rolls 37 and 38 of the same size as the roll 36. The rolls 35, 36 and the rolls 37, 38 are mounted on horizontal supporting shafts 39 and 40 for rotation about horizontal axes parallel to the axes of the feed rolls 7, 8 and the feed rolls 9, 10. The upper cylindrical roll 35 is provided with an annular circumferential groove 41 having a uniform width and a uniform depth equal to or slightly greater than the width and thickness of the gauze strip W, for example, as shown in Fig. 10. The roll 35 and its groove 41 are vertically aligned with the central portion 34 of the adhesive surface at 2 as indicated in Fig. 10 and the vertical side faces 42 and 43 of the rolls 35 and 36 are located in substantially the same vertical planes as the side faces 13 of the bar 11 so that the gauze strip W is centered as it is applied to the backing sheet 1.

If desired, the strip W may be adhered to the backing strip by the rolls 35 and 36, but as herein shown the strip is adhered to the backing strip by the cylindrical rolls 37 and 38 whose vertical side faces are also in the plane of the side faces 13. The rolls 37 and 38 press the backing sheet and the gauze strip together a short distance downstream of the rolls 35 and 36 so as to adhere the strip securely to the backing sheet.

Since the feed rolls 35 and 37 are the same width as the finger 19 and since the rolls 36 and 38 have the same cross-sectional shape near the strip S as the bar 11, the strip S does not change shape substantially as it moves from the folding member 18 to the feed rolls 37, 38. However, the strip changes shape substantially as it moves from the latter rolls to the rolls 9, 10 as best indicated by a comparison of Figs. 10 and 11.

A smooth rectangular metal guide plate 44 of uniform thickness is mounted in a fixed position between the rolls 10 and 38 as shown in Figs. 5 and 6 to engage the edges of the strip side portions 27 so as to raise said portions gradually and to guide them properly as they move toward the rolls 9, 10. The upper roll 9 has a centrally located circumferential groove 45 with a depth not substantially greater than the thickness of the gauze strip W which receives the inner side portions of the facing sheets and said strip W, the cylindrical bottom surface of the groove pressing the portions 33 flat against the gauze strip so that their side edges 4 are substantially in engagement and the cylindrical surfaces of the roll on opposite sides of the groove pressing the outer side portions of the facing sheets against the backing sheet so that the backing sheet is flat.

As the flattened strip S and its enclosed gauze strip W passes from the rolls 9 and 10 it is cut into a series of individual bandages 46 of the same size as shown in Fig. 12, each bandage having a length corresponding to the width of the strip S and having width preferably less than one third said length. The gauze strip W is cut transversely when the strip S is cut transversely to provide a rectangular or substantially square absorbent compress 47 at the middle of the bandage 46 having its opposite side edges aligned with the opposite side edges of the cut backing strip 48 and the cut facing strips 49.

The cutting means for the strip S and its enclosed gauze strip W comprises a stationary transverse cutter bar 50 and a vertically movable cutter blade or knife 51 which has a flat vertical face that slidably engages the flat vertical face of the cutter bar at the completion of the downward cutting stroke. The feed rolls 9 and 10 may be driven at a constant speed by a suitable motor means (not shown) and the cutter blade 51 may be reciprocated at regular intervals in timed relation to the rotation of said feed rolls by said motor means so as to cut the strip S into bandages of the same width as said strip leaves said feed rolls.

The roll which supplies the continuous strip S to the feed rolls 7 and 8 may be replaced after it is completely unwound by another roll and a suitable splice may be made so that the machine may be operated continuously without rethreading. The roll supplying the continuous gauze strip W may be replaced in a similar manner.

The machine of the present invention may be operated continuously at relatively high speeds without serious malfunctions and produces adhesive bandages at nominal cost. A small tension is applied to the moving strip S by the feed rolls 9, 10 to insure a smooth flow of material through the machine. The paper facing sheets 3 reinforce the plastic backing sheet 1 during operation so as to prevent malfunctions of the machine.

It will be understood that, in accordance with the provisions of the patent statutes, variations and modifications of the specific method and apparatus disclosed herein may be made without departing from the spirit of the invention.

Having described my invention, I claim:

1. A method of preparing adhesive bandages from a continuous flexible strip having a flexible continuous backing sheet covered by a layer of adhesive and a pair of continuous facing sheets covering the adhesive and having inner side edges in abutting relation at the center of said strip, said method comprising separating said side edges to uncover the central portion of said adhesive layer, applying gauze to the uncovered adhesive layer to adhere the gauze thereto, then moving said side edges together so that the facing sheets cover said gauze, and thereafter dividing the strip transversely into a series of adhesive bandages.

2. A method of preparing adhesive bandages from an elongated strip having a continuous flexible plastic backing sheet with a pressure-sensitive adhesive surface and a pair of facing strips covering the adhesive surface and having parallel inner side edges substantially in abutting relation near the center of said strip, said method comprising the steps of separating said side edges to uncover the central portion only of said adhesive surface, applying a continuous strip of absorbent dressing material to the exposed central portion of said adhesive surface to adhere said dressing material to said surface, thereafter moving said side edges together over said dressing material so as to cover the same, and cutting the strip and its enclosed dressing material transversely into a series of elongated rectangular adhesive bandages.

3. A method of preparing adhesive bandages from a continuous flexible moving strip having a continuous flexible plastic backing sheet covered by a layer of a pressure-sensitive adhesive and a longitudinally continuous facing sheet of flexible paper covering the adhesive and split midway between the opposite sides of the strip, said method comprising the steps of moving the central portion of the backing sheet longitudinally while holding the same relatively flat and bending the opposite side portions of the strip to separate the portions of the facing sheet which cover said central portion so as to expose the adhesive surface of said central portion, applying a continuous strip of absorbent dressing material to the exposed adhesive surface of the moving strip to adhere said dressing material to the strip, thereafter bending the side portions of the strip back towards their original positions relative to the central portion of the strip during longitudinal movement of the strip so that the last-named portions of the facing sheet cover said dressing material, and cutting the strip and its enclosed dressing material transversely into a series of adhesive bandages.

4. A method of preparing adhesive bandages in a continuous operation from a continuous flexible plastic backing strip having a continuous pressure-sensitive adhesive surface comprising adhering to said surface a facing comprising a pair of parallel paper strips extending between the side edges of the backing strip and arranged with their inner side edges substantially in engagement at the center of the backing strip, separating the inner side portions of the paper strips from the adhesive surface while moving the backing strip longitudinally to expose the central portion of the adhesive surface of the moving backing strip, adhering a continuous strip of gauze to the exposed adhesive surface of the moving backing strip midway between the sides of the strip, moving the inner side portions of the facing strips over the gauze to cover the same, and cutting the resulting assembled strip laterally to form small adhesive bandages having a length corresponding to the width of said assembled strip.

5. Apparatus for preparing adhesive bandages from a strip having a continuous flexible backing sheet and a pair of facing sheets adhered to said backing sheet and having inner side edges in abutting relation at the center of said strip, said apparatus comprising: means forming a bed having a width less than half that of said strip for supporting the central portion of said strip in a generally flat position, means for moving said strip over said bed, supporting means on opposite sides of said bed for holding the moving strip substantially flat, means for turning the side portions of the moving strip downwardly over the sides of said bed between said supporting means and for moving the inner side portions of said facing sheets to a position substantially perpendicular to said central portion of said strip so as to expose said central portion, means above the exposed central portion for applying a continuous strip of gauze to said exposed central portion and for pressing the gauze against the backing sheet, and means downstream of said last-named means for moving the inner side portions of said facing strips over said gauze and for pressing said inner portions against the gauze so that the inner side edges of said facing sheets are substantially in engagement and said gauze is substantially completely covered by said facing sheets.

6. Apparatus for preparing adhesive bandages comprising spaced rollers for supporting a moving strip having a continuous backing sheet covered by a pair of continuous facing sheets in a substantially horizontal position, a guide bar between said rollers having a width less than half that of said strip for supporting the central portion of said strip in a horizontal position, means forming a channel between said rollers of a width less than that of said strip having side faces that engage the opposite side portions of said strip to turn them over the sides of said bar, a separating member directly above said bar and spaced a short distance from said backing sheet for disengaging the inner side portions of said facing sheets from said backing sheet to expose the central portion only of the moving backing strip, means including a roller above said central portion downstream of said separating member for applying a continuous strip of gauze to said backing strip, and means including a pressure roller for pressing the gauze against said backing strip and for pressing the inner side portions of said facing sheets against the outer surface.

References Cited in the file of this patent

UNITED STATES PATENTS

| | | |
|---|---|---|
| 1,802,814 | Henderson | Apr. 28, 1931 |
| 2,033,736 | Perryman | Mar. 10, 1936 |
| 2,320,092 | Miller | May 25, 1943 |
| 2,553,270 | Parrott | May 15, 1951 |
| 2,572,641 | Manley | Oct. 23, 1951 |